United States Patent [19]

Tanaka et al.

[11] Patent Number: 5,724,090
[45] Date of Patent: Mar. 3, 1998

[54] IMAGE FORMING METHOD AND APPARATUS THEREOF WITH CONTROL OF DOT POSITION

[75] Inventors: Mamoru Tanaka, Yokohama; Nobuyuki Ito, Oume, both of Japan

[73] Assignee: Canon Kabushiki Kaisha, Tokyo, Japan

[21] Appl. No.: 754,476

[22] Filed: Nov. 22, 1996

Related U.S. Application Data

[63] Continuation of Ser. No. 144,560, Nov. 2, 1993, abandoned.

[30] Foreign Application Priority Data

Nov. 6, 1992 [JP] Japan .................... 4-296933

[51] Int. Cl.$^6$ .................................................. B41J 2/47
[52] U.S. Cl. ................................... 347/251; 347/131
[58] Field of Search .......................... 347/254, 131, 347/240, 251; 358/298

[56] References Cited

U.S. PATENT DOCUMENTS

| | | | |
|---|---|---|---|
| 4,782,398 | 11/1988 | Mita | 358/280 |
| 4,868,684 | 9/1989 | Suzuki | 358/455 |
| 5,325,474 | 6/1994 | Kumazaki et al. | 395/133 |
| 5,374,950 | 12/1994 | Yasuda et al. | 347/115 |
| 5,432,611 | 7/1995 | Haneda et al. | 358/298 |

*Primary Examiner*—Mark J. Reinhart
*Attorney, Agent, or Firm*—Fitzpatrick, Cella, Harper & Scinto

[57] ABSTRACT

An image forming method and apparatus which forms an image by using PWM to properly reproduce tones at a low density in the image formation, and attain a high-quality image without reducing the resolution in the dot formation corresponding to a high density value. A color laser beam printer using the PWM to which the present invention is applied forms a latent image onto a photosensitive drum by the laser beam irradiated from a semiconductor laser. The waveform of a chopped wave signal used in the PWM is set to be unique with respect to each color component, and be asymmetrical to the center of each pixel represented by the image signal in synchronization with the waveform of the chopped signal. Accordingly, the interval of dots formed to correspond to each color component is relatively wide when the density value is small, while the interval is relatively narrow when the density value is large.

17 Claims, 14 Drawing Sheets

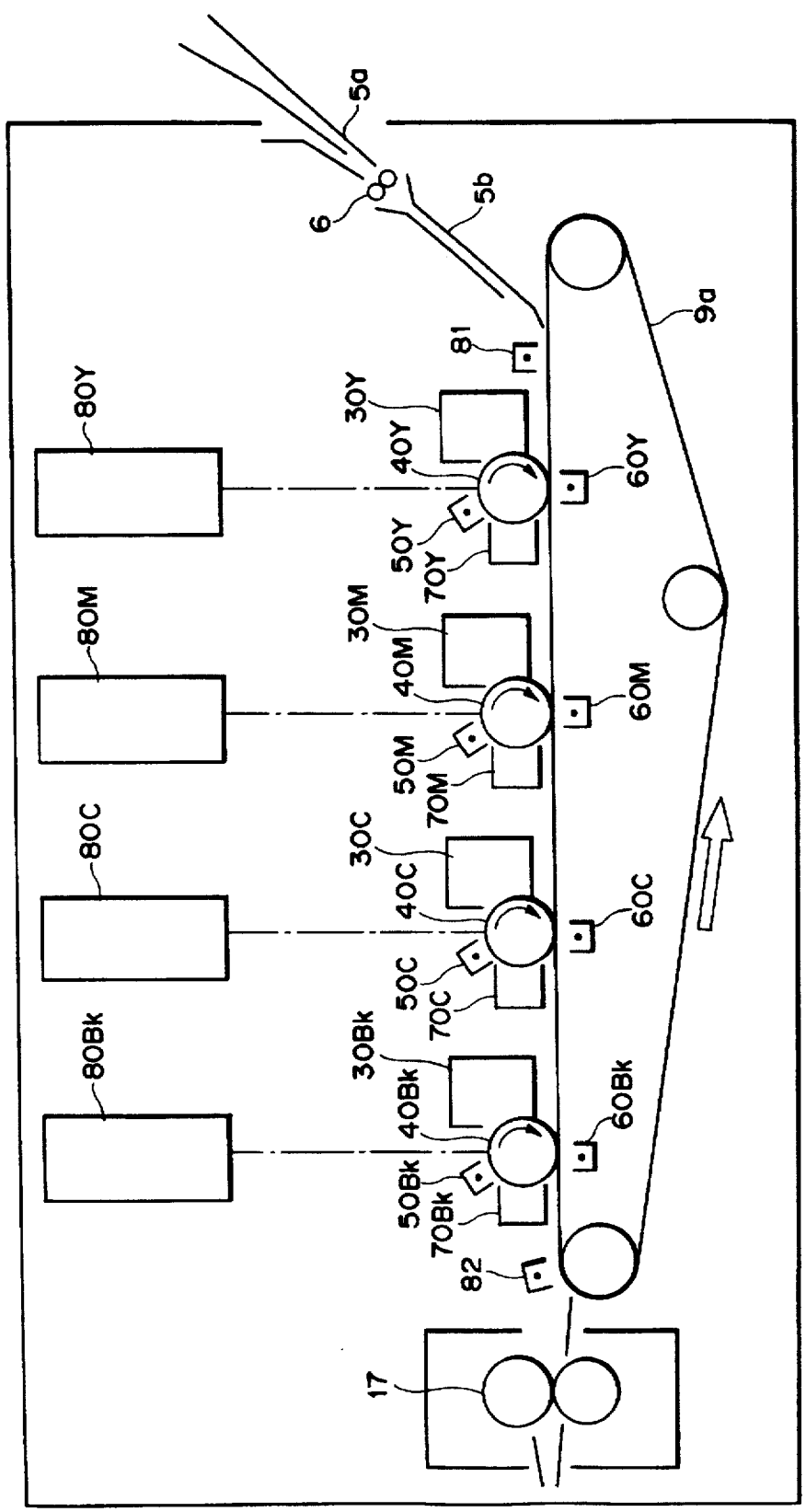

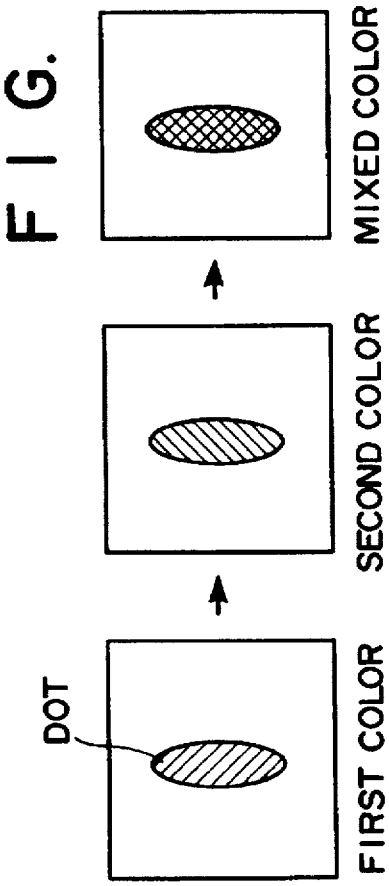
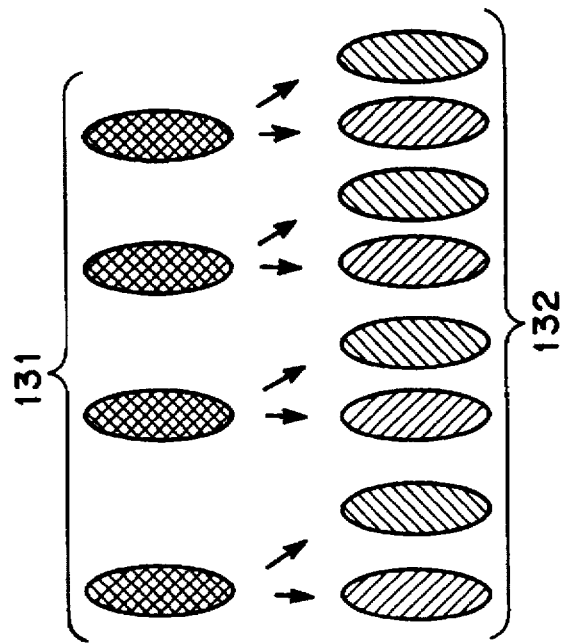
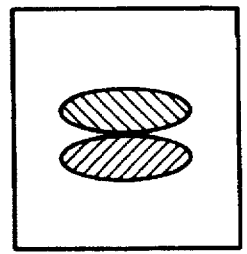

HIGH DENSITY    LOW DENSITY

HIGH DENSITY    LOW DENSITY

1

IMAGE FORMING METHOD AND APPARATUS THEREOF WITH CONTROL OF DOT POSITION

This application is a continuation of application Ser. No. 08/144,560 filed Nov. 2, 1993, now abandoned.

BACKGROUND OF THE INVENTION

The present invention relates to an image forming method and apparatus thereof and, more particularly, to an image forming method and apparatus using an electro-photographic process including signal modulation in the image forming apparatus which processes a digital signal used for a full-color printer and the like as image information.

Among image forming apparatuses, there is a laser beam printer using an electro-photographic process as a high-speed low-noise printer. The typical recording method is a binary recording method such as controlling the ON/OFF of laser beam irradiation onto a photoreceptor and performing image formation. In image recording of characters and figures, the construction of a printer can be simple, since halftone is not required.

However, there are printers which can represent print halftone by the binary recording method. Among such printers, one of which employs binarizing processing such as the dither method or density pattern method is well known. However, as already known, in the printer using the dither method or the density pattern method, high resolution cannot be attained. However, a method of forming a halftone pixel in each pixel at the high resolution, without reducing the recording density, has been proposed recently. The method is such that a halftone pixel is formed by modulating the pulse width of an irradiating laser beam in accordance with an image signal (hereinafter, this method is referred to as "PWM"). By PWM, image formation at the high resolution and multi-tone representation are enabled. Accordingly, PWM became a necessary method in a color image forming apparatus for the purpose of the high resolution and multi-tone representation. More particularly, in PWM, since a dot area formed by changing the diameter of a beam spot in accordance with an image signal can be changed in each pixel, the tone representation can be attained, and halftone can be represented without reducing the pixel density (recording density) to be recorded.

However, in conventional PWM, in a portion where the recording density is relatively low, it is difficult to represent well the tonality of the portion due to a short period of laser irradiation (a short pulse width). Furthermore, as shown in FIG. 13A, when an image is formed at the low density with a plurality of colors, small dots need to lay on top of each other in the same position within the pixel. Thus, a positional deflection may occur owing to the limitation of mechanical accuracy of the polygon mirror which scans a laser beam for image formation. As a result, color tone is changed due to the deflection of dot positions in different colors as shown in FIG. 13B.

Accordingly, a technique to properly reproduce a color tone is required when dots in multiple colors are laid on the same position in a manner such that the centers of each dot in different colors are always separated from each other by a certain distance (see numeral 132 of FIG. 13C) or the centers of each dot are controlled to be superimposed on the same position (see numeral 131 of FIG. 13C). As apparent from the comparison between FIG. 14A (the case where there is a dot shift) and FIG. 14B (the case where there is no dot shift), the change of color tone stands out for a small deviation in the dot formation, since in PWM, the lower the density is, the smaller the dot diameter becomes in PWM. Furthermore, the above drawback needs to be solved when it is considered that the human eyes are insensitive to the difference of hue in a case where an image density is high and its brightness is low, while they are sensitive in a case where the image density is low and its brightness is high.

SUMMARY OF THE INVENTION

Accordingly, an object of the present invention is to provide an image forming method capable of attaining a high-quality image by improving tone representation in low density image information and maintaining the resolution in high-density image formation.

It is another object of the present invention to provide an image forming method capable of properly reproducing color tones even though a positional shift of dots occurs in an image formation.

According to the present invention, the foregoing object is attained by providing an image forming method which modulates a light beam in accordance with a density value of each pixel represented by an image signal and forms an image corresponding to the density value by irradiating the modulated light beam onto photoreceptive means, comprising: input step for inputting the image signal; modulation step for modulating the light beam based on the image signal; irradiating step for irradiating the modulated light beam onto the photoreceptive means; formation step for forming a dot corresponding to a beam spot formed by irradiation of the modulated light beam; and shift step for shifting the center position of the dot formed by the formation step in accordance with the density value.

It is another object of the present invention to provide an image forming apparatus capable of properly reproducing color tones and providing a high-quality image against a positional shift in dots without reducing the resolution.

According to the present invention, the foregoing object is attained by providing an image forming apparatus which modulates a light beam in accordance with a density value of each pixel represented by an image signal and forms an image corresponding to the density value by irradiating the modulated light beam onto photoreceptive means, comprising: input means for inputting the image signal; modulation means for modulating the light beam based on the image signal; irradiating means for irradiating the modulated light beam onto the photoreceptive means; formation means for forming a dot corresponding to a beam spot formed by irradiation of the modulated light beam; and shift means for shifting the center position of the dot formed by the formation means in accordance with the density value.

In accordance with the present invention as described above, the center position of a beam spot formed by irradiation of a modulated light beam based on an input image signal is shifted by a small amount in accordance with the density value of an input image signal, and a dot corresponding to the beam spot is formed. Furthermore, it is controlled so that the shift amount is relatively large when the density value is small, while it is relatively small when the density value is large.

The invention is particularly advantageous since color tone is properly reproduced with respect to the positional shift in dots which are generated in an image formation. Furthermore, since the shift amount of the dot center is small in the dot formation in accordance with a high-density value, a high-quality image can be attained without reducing the resolution.

3

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated and constitute a part of the specification, illustrate embodiments of the invention and, together with the description, serve to explain the principles of the invention.

FIG. 12 is a sectional side view showing the construction of the color laser beam printer adopting a multiple drum;

FIGS. 13A, 13B, and 13C are diagrams for explaining a beam spot and color blur in accordance with conventional PWM.

DESCRIPTION OF THE PREFERRED EMBODIMENTS

Preferred embodiments of the present invention will now be described in detail in accordance with the accompanying drawings.

<Description of the Common Portions through the Embodiments>

Figure 1:
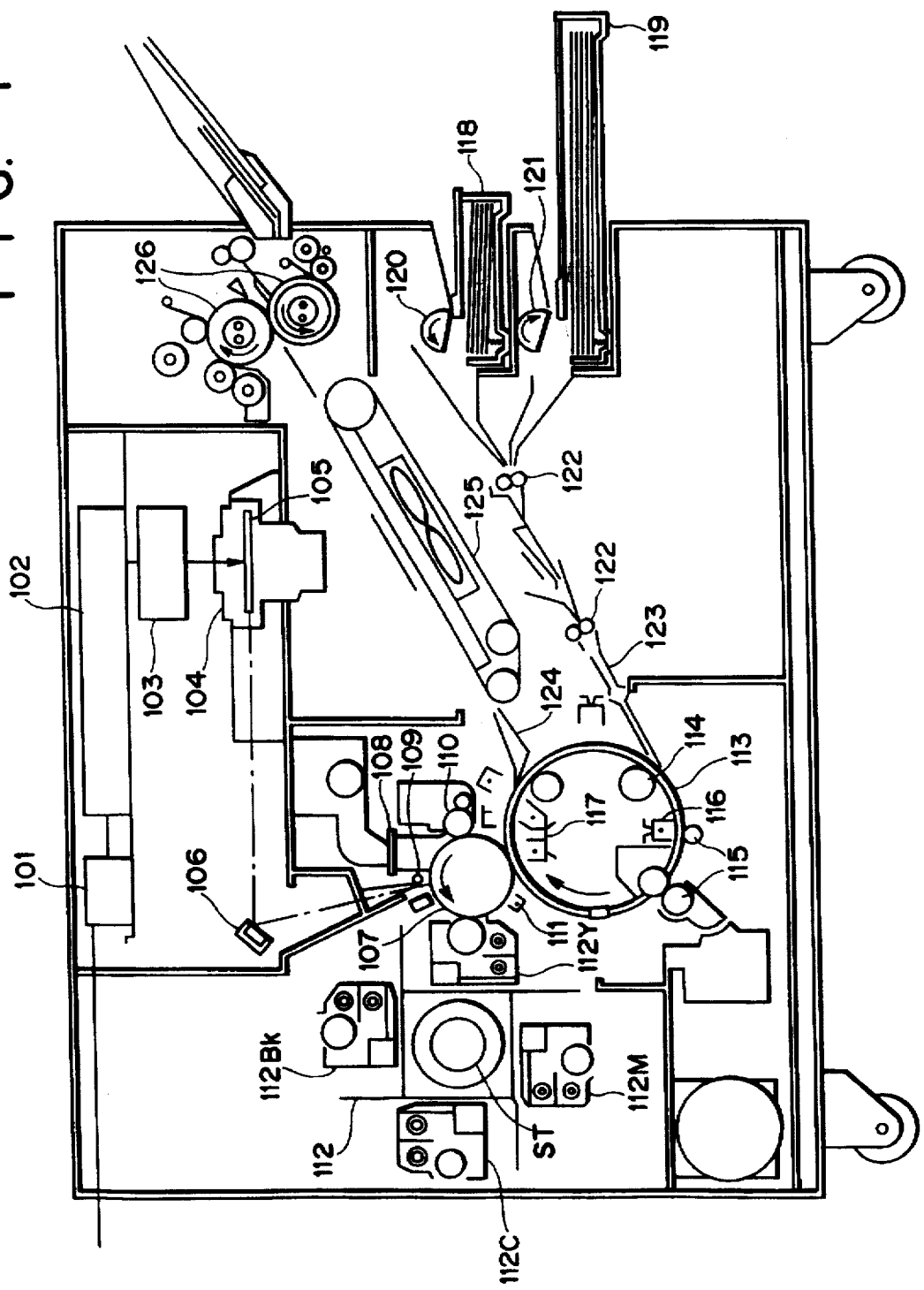
FIG. 1 is a sectional side view showing the construction of the color laser beam printer used throughout the embodiments according to the present invention.

FIG. 1 is a sectional side view showing the construction of a color laser beam printer (hereinafter referred to as "CLBP") used throughout the embodiments described below.

4

In FIG. 1, numeral 101 is an external interface for receiving an image signal from a host computer connected to the CLBP, numeral 102 is a signal processor for processing the image signal, and numeral 103 is a semiconductor laser for emitting a laser beam based on the image signal outputted from the signal processor 102. Furthermore, numeral 104 is a laser beam scanner including a polygon mirror 105 (e.g. an octahedron), a motor for rotating the polygon mirror 105 (not shown), and an f/θ lens (numeral 127 in FIG. 2). Numeral 106 is a reflector for changing an optical path of the laser beam, and numeral 107 is a photosensitive drum. Still further, numeral 108 is a primary electrostatic charger, numeral 109 is a whole image exposure lamp, numeral 110 is a cleaner for collecting remaining toners which have not been transferred onto a recording paper, and numeral 111 is a transfer electrostatic charger. These units are provided in the vicinity of the photosensitive drum 107.

Numeral 112 is a developing unit for developing an electrostatic latent image formed onto the photosensitive drum 107 by laser exposure. The developing unit 112 is composed of a yellow developing unit 112Y for developing by yellow (Y) toner, a magenta developing unit 112M for developing by magenta (M) toner, a cyan developing unit 112C for developing by cyan (C) toner, and a black developing unit 112BK for developing by black (BK) toner.

For example, when a toner image in yellow is formed, a yellow-toner developing processing is performed in the position shown in FIG. 1. When a toner image in magenta is formed, the developing unit 112 is rotated with respect to the shaft ST of FIG. 1 so that the magenta developing unit 112M comes into contact with the photosensitive drum 107. Similarly, the toner developing processings in cyan and black are performed.

Furthermore, numeral 113 is a transfer drum for transferring the toner image formed on the photosensitive drum 107 to a paper, numeral 114 is a transfer-drum cleaner, numeral 115 is a paper cover roller, numeral 116 is an electric discharger, and numeral 117 is a transfer electrostatic charger. These units 114–117 are provided in the vicinity of the transfer drum 113.

Numerals 118 and 119 are paper feeding cassettes. In FIG. 1, the cassette 118 contains A4 papers, while the cassette 119 contains A3 papers. Numerals 120 and 121 are paper-feeding rollers for feeding papers respectively from the cassettes 118 and 119. Numeral 122 are timing rollers for taking a timing of paper feeding or transferring. The paper transferred via the rollers 120–122 is lead by a paper guide 123 and is wound around the transfer drum 113, and the process proceeds to image forming processing. Selecting either the cassette 118 or 119 is determined by instruction from a control panel (not shown), and only the selected paper-feeding roller is rotated.

Numeral 124 is a separation claw for separating the paper from the transfer drum 113 where static electricity is applied to adhere the paper after the image formation processing. Numeral 125 is a transfer belt for transferring the paper separated from the transfer drum 113, and numeral 126 is an image fixing unit for fixing the image on the paper transferred from the transfer belt 125.

Figure 2:
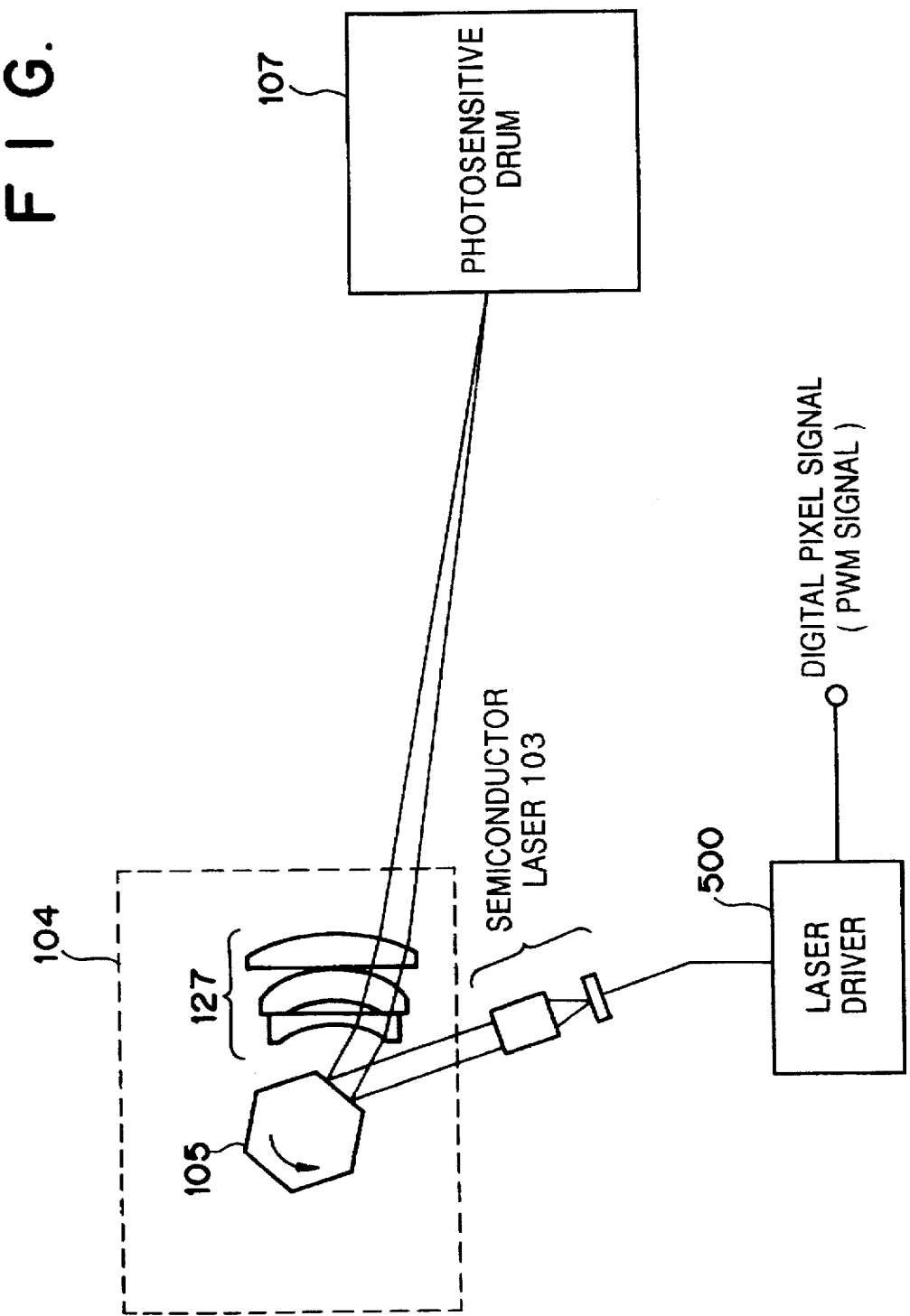
FIG. 2 is a representation showing the construction of a laser beam scanner 104 and peripherals.

FIG. 2 is a schematic diagram illustrating the laser beam scanner 104 and the peripherals. The laser beam irradiated from the semiconductor laser 103 driven by a laser driver 500 in accordance with a digital image signal is reflected by one side of the polygon mirror 105 and performs a raster scanning on the surface of the photosensitive drum 107 which is being rotated in the arrow's direction as shown in FIG. 1 via the f/θ lens 127 and mirror 106 (not shown in FIG. 2). Accordingly, an electrostatic latent image corresponding to the original image is formed onto the photosensitive drum 107.

Figure 3:
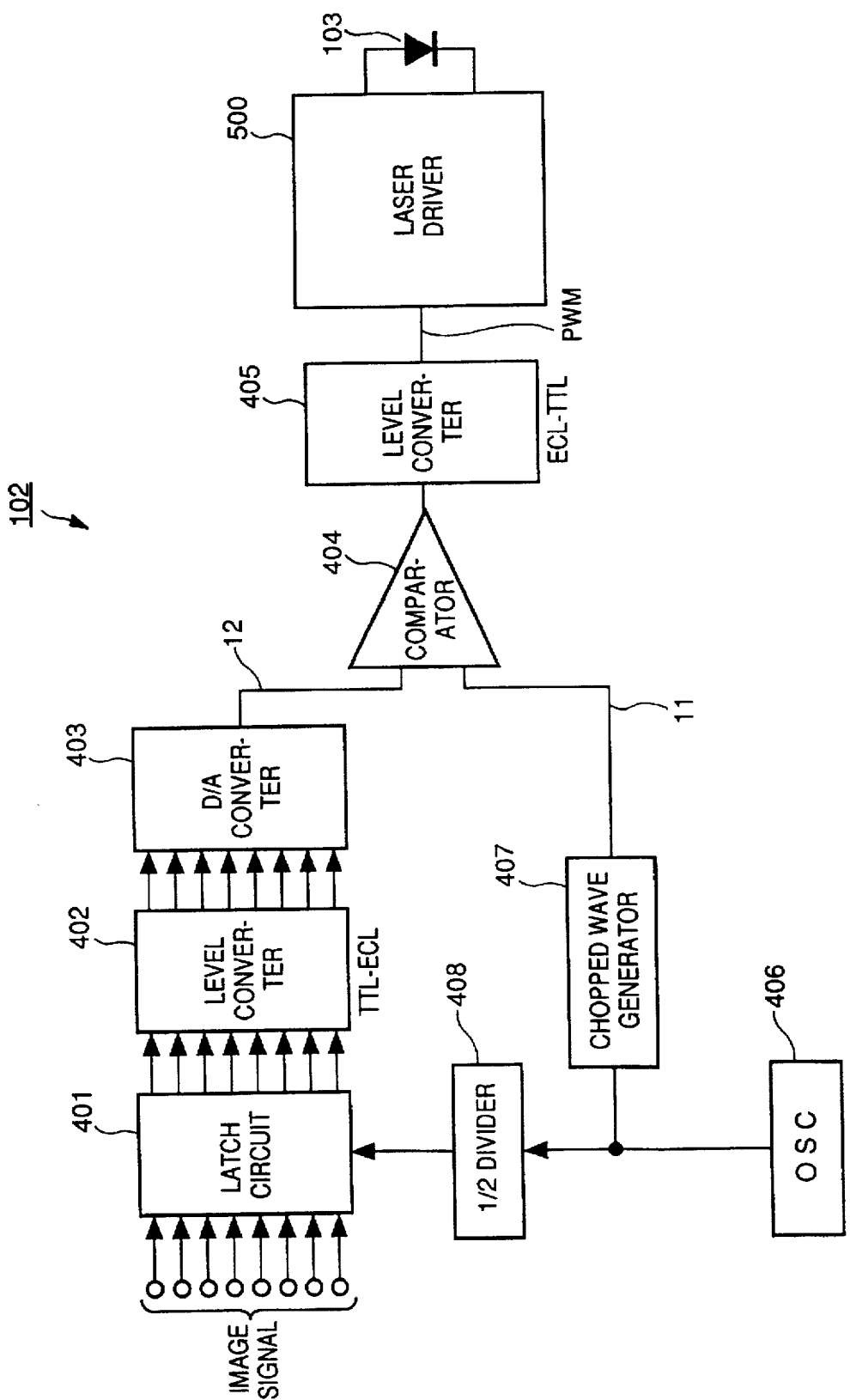
FIG. 3 is a block diagram illustrating the construction of a signal processor 102 for generating a pulse signal in order to perform a laser-light-emitting control in each dot in accordance with conventional PWM.

FIG. 3 is a block diagram illustrating the construction of the signal processor 102 which generates a pulse signal for performing a laser-light-emitting control on each dot. In FIG. 3, numeral 401 is a latch circuit, numerals 402 and 405 are level converters comprised of the IC of TTL-ECL, numeral 403 is a D/A converter, numeral 404 is a comparator, numeral 406 is an oscillator (OSC), numeral 407 is a chopped wave generator, numeral 408 is a ½ divider, and numeral 500 is a laser driver. Furthermore, numeral 11 is a chopped wave signal, and numeral 12 is a digitized image signal (hereinafter referred to as an "image signal" or "pixel density signal").

As shown in FIGS. 1–3, the image forming apparatus using the digital electro-photographic technique drives the laser driver 500 based on the image signal transmitted from an image information signal source (e.g. a host computer (not shown) or a reader (not shown) which reads an original), scans the photosensitive drum 107 by the light beam from the semiconductor laser 103, forms a laser beam spot on the surface of the photo sensitive drum 107, forms an electrostatic latent image, and performs image recording onto a recording paper by the well-known electorophotographic process.

Figure 4:
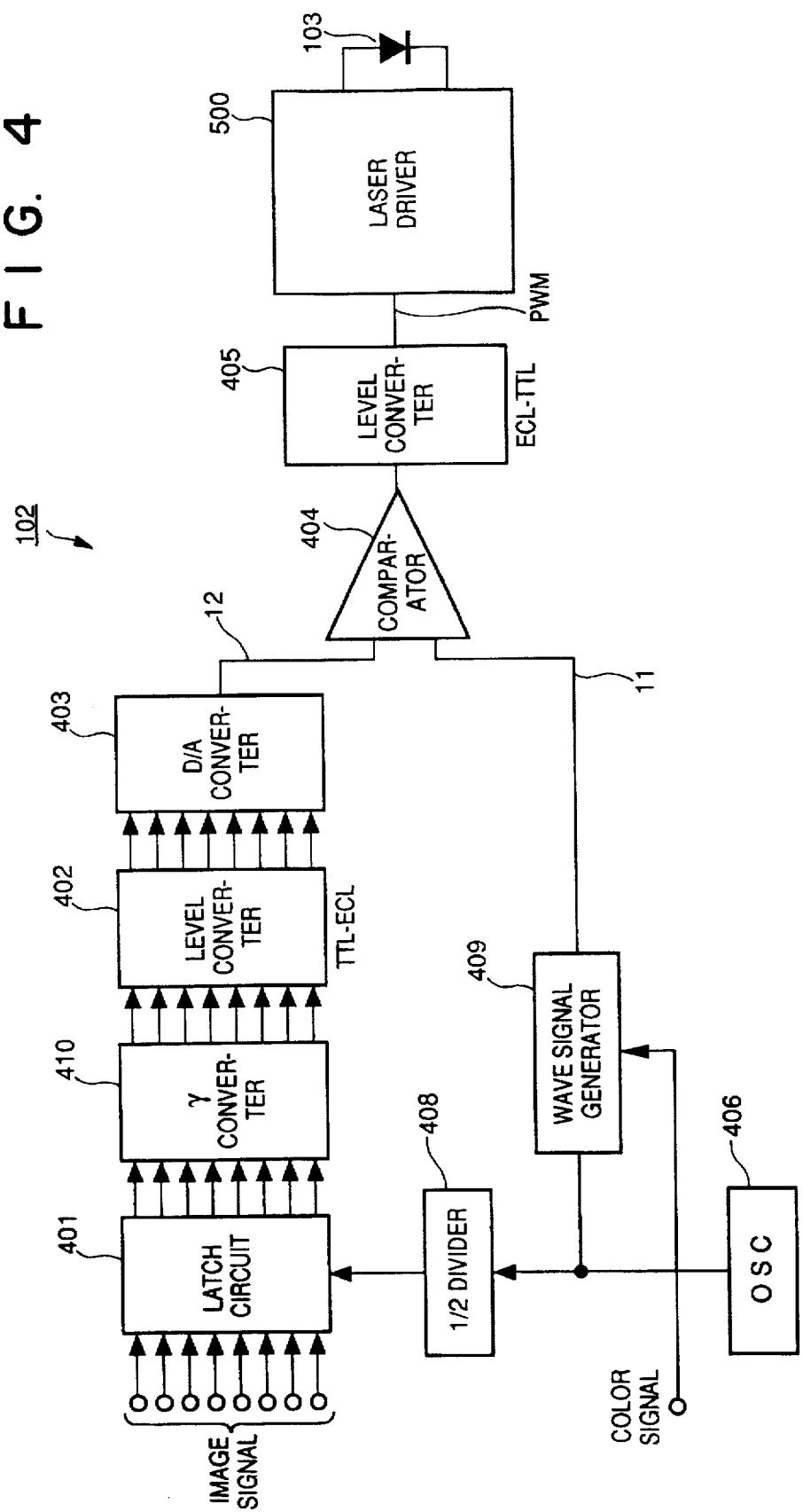
FIG. 4 is a block diagram illustrating the construction of a signal processor 102 for generating a pulse signal in order to perform a laser-light-emitting control on each dot used in the embodiments of the present invention.

On the other hand, FIG. 4 is a block diagram illustrating the construction of the signal processor 102 which generates a pulse signal for performing a laser-beam-emitting control in each dot used in the embodiments of the present invention. In FIG. 4, the elements which are identical to those of FIG. 3 have the same reference numerals. In FIG. 4, numeral 409 is a wave signal generator for generating various shapes of chapped waves in accordance with the value indicated by an inputted color signal (an image signal in each color component) or an image signal. Numeral 410 is a γ converter which performs γ conversion to the density value represented by an input color signal or an image signal. The γ characteristic of the γ converter is defined by considering the characteristics of the waveform signal generator 409, the printer, and an input image signal.

<First Embodiment (FIGS. 5–9)>

First, the conventional PWM is explained with reference to FIG. 5 in order to compare with the present embodiment. It is assumed that "0V" of an image signal 12 indicates the minimum value of density value and "−1V" indicates the maximum value.

Figure 5:
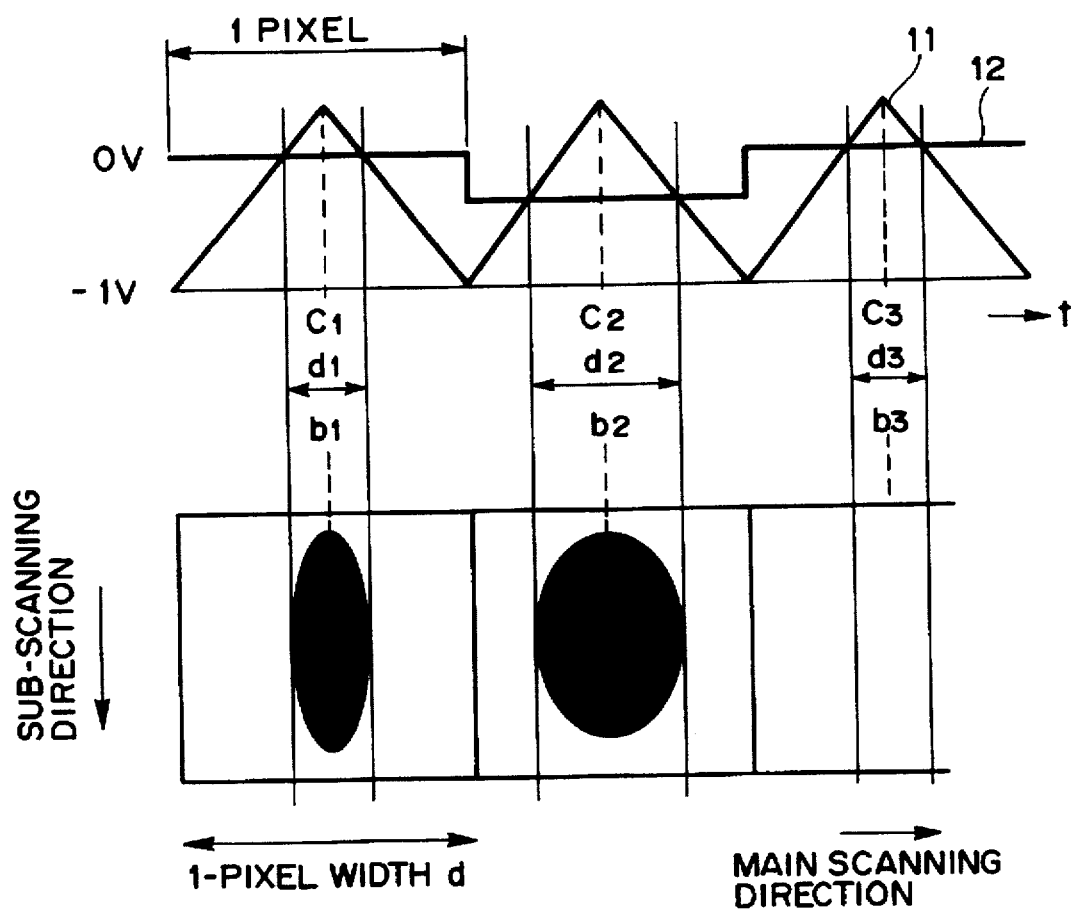
FIG. 5 is a diagram for explaining conventional PWM.

In the conventional PWM, as shown in FIG. 5, latent image formation corresponding to each pixel on a photosensitive drum is performed by emitting a laser beam for the time duration $(d_1, d_2, d_3, \ldots)$ which is defined as a difference between the chopped wave signal 11 and the image signal (pixel density signal) 12. The chopped wave signal 11 is symmetrical to the center $(c_1, c_2, c_3, \ldots$ of FIG. 5) of each pixel represented by an image signal in the main scanning direction. Subsequently, the latent image formation is performed so that the center $(b_1, b_2, b_3, \ldots)$ of a beam spot is always the center of the pixel $(c_1, c_2, c_3, \ldots)$. As the density value represented by the image signal 12 increases, the beam spot becomes larger as approaching one pixel width (d). When a color image is formed by laying a plurality of color toners on top of another, dots in different colors are formed in the same position within the same pixel area by using the same chopped wave with respect to each color component.

According to the conventional approach, as shown in FIG. 13A, when an image is formed in a low density and in multiple colors, very tiny dots are required to lay on each other in the same position within the pixel. However, when positional shift occurs in the dots owing to the limitation of the mechanical accuracy of the polygon mirror which scans the laser beam, the position of the dot formed by the different color toners are shifted and the color tone is changed as shown in FIG. 13B.

In order to reduce the color tone change, as shown in FIG. 13C, a technique such that the center of dot in each color is kept away from the other by a certain distance or each center lays always on top of other has been required.

In the conventional PWM construction, during the dot formation, the lower the density is, the easier the color tone change occurs to the shift.

The human eyes are insensitive to the difference of hue when the image density is high and the brightness is low. However, since they are sensitive when the brightness is high, the change of tone is perceptible in the image area where the density is low and the brightness is high. Furthermore, in a case of an achromatic image, if dots are scattered, it is sensitive to human eyes. As a result, tone representation in a low density portion is difficult.

In this embodiment, in order to overcome the above drawback, the waveform of chopped wave, which is a reference signal for the PWM, is changed in accordance with the color component and density value represented by an image signal.

FIG. 6A through FIG. 8 are diagrams illustrating the concept of the control of the waveform change of a chopped wave in accordance with the embodiment. FIG. 9 is a diagram for describing reference numerals and characters used in the embodiment.

In FIG. 9, numeral 1 is a maximum area of one pixel of the beam spot formed by a laser beam (hereinafter referred to as a "pixel area"). The edge position of the upper stream side of the pixel area 1 in the main scanning direction is referred to as 1<$a$>, while the edge position of the down-stream side in the main scanning direction is referred to as 1<$b$>. The width of the pixel area 1 in the main scanning direction is referred to as "d". It should be noted that the time for starting a laser beam irradiation at the edge 1<$a$> of the pixel area 1 is "$t_0$", and the time duration for sweeping the laser beam in the main scanning direction to the pixel area 1 is "dt". Numeral 2 is a beam spot formed by a laser beam, hereinafter referred to as a "dot".

Furthermore, regarding the dot 2 in the pixel area 1, the edge of the upper stream side in the main scanning direction is referred to as a "write start edge 2<$x$>", the center position of the dot 2 in the pixel area 1 is referred to as a "dot center 2<$c$>", the edge of the downstream side in the main scanning direction is referred to as a "write end edge 2<$y$>", and the distance between 2<$x$> and 2<$y$> is referred to as a "dot width dd".

Figure 6A:
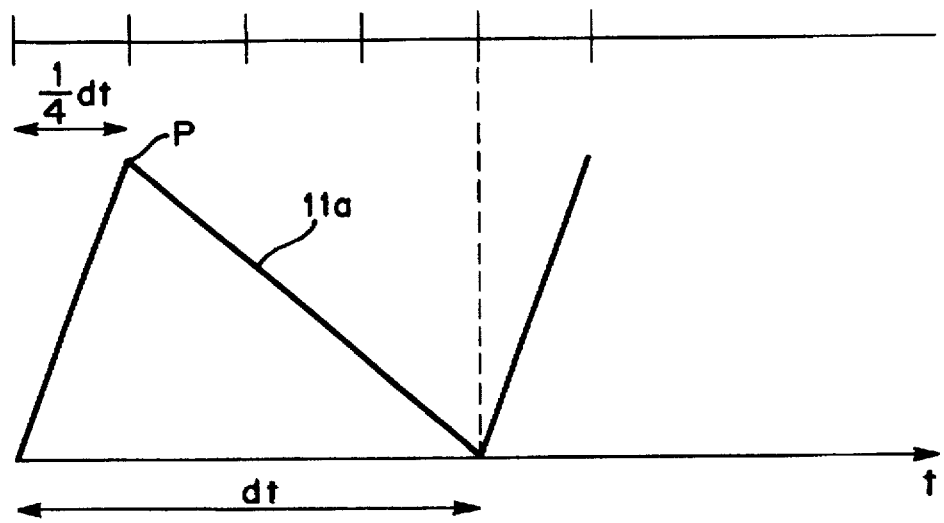
FIGS. 6A, 6B, and 6C show the concept of a waveform control of chopped wave in a case where toner images of two colors are synthesized.
Figure 6B:
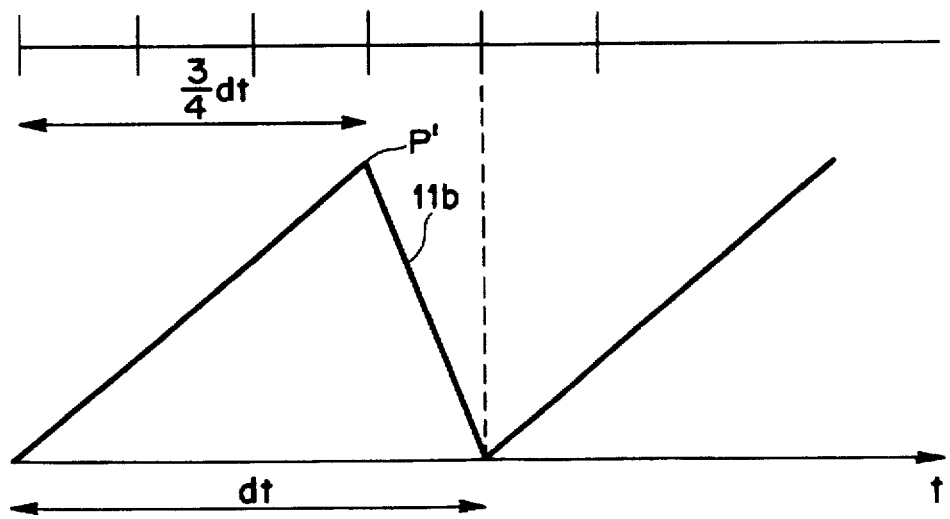
Figure 6C:
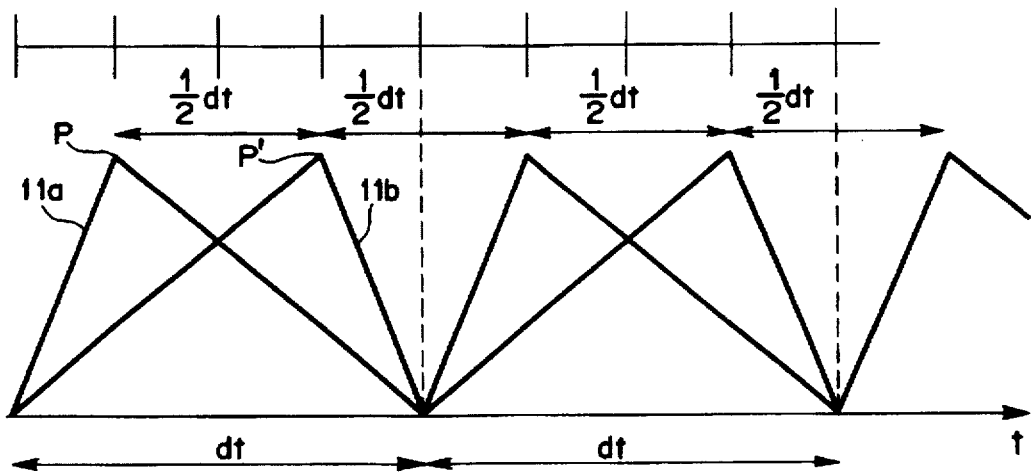
Figure 7:
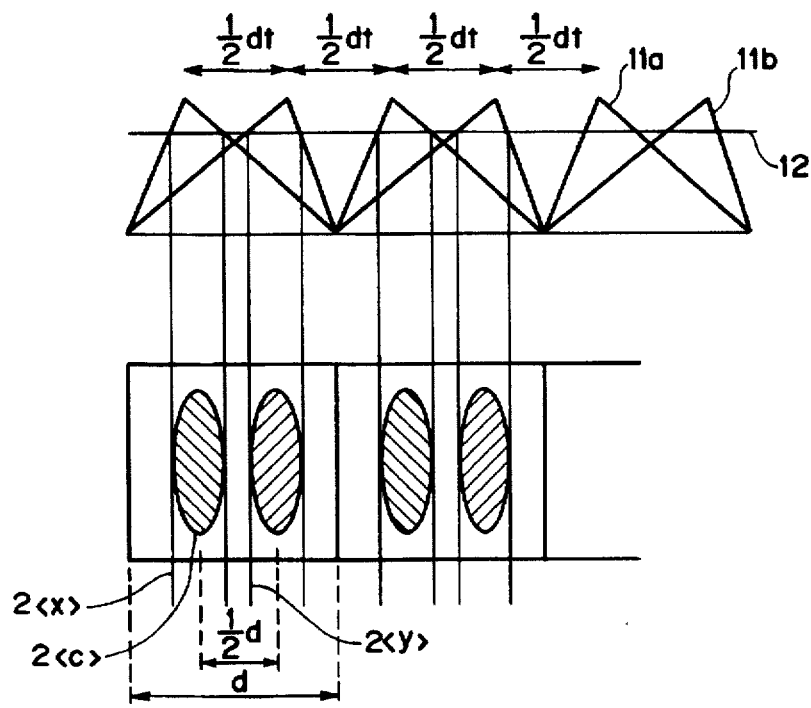
FIG. 7 is a diagram showing the toner images formed by changing the waveform of the chopped wave shown in FIG. 6C.
Figure 8:
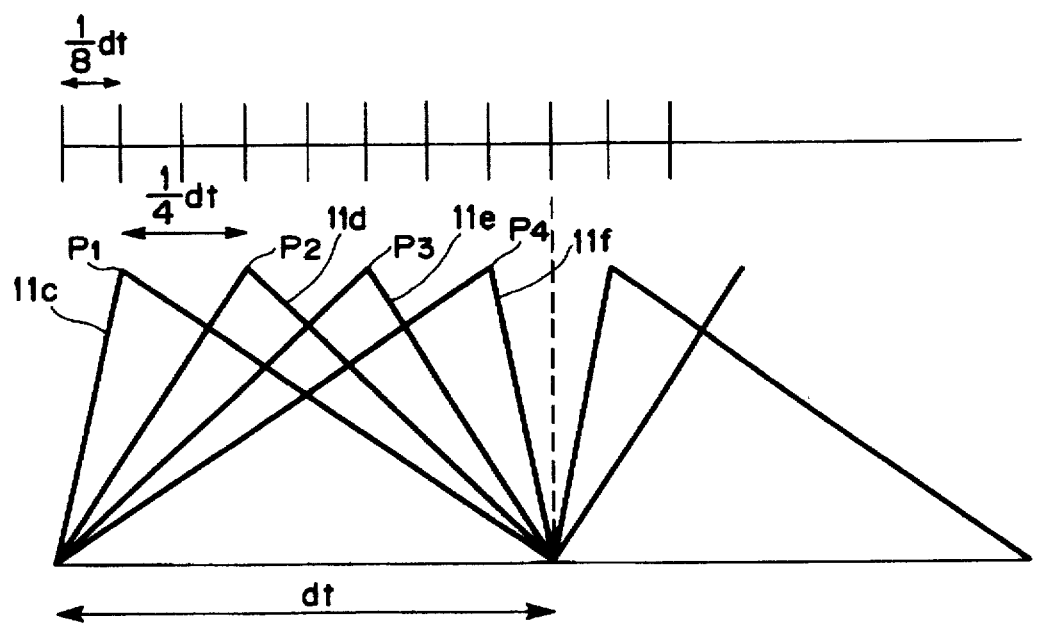
FIG. 8 is a diagram showing the change of the waveforms of the chopped waves in a case where the concept of synthesizing the toner images in two colors is applied to four colors.
Figure 9:
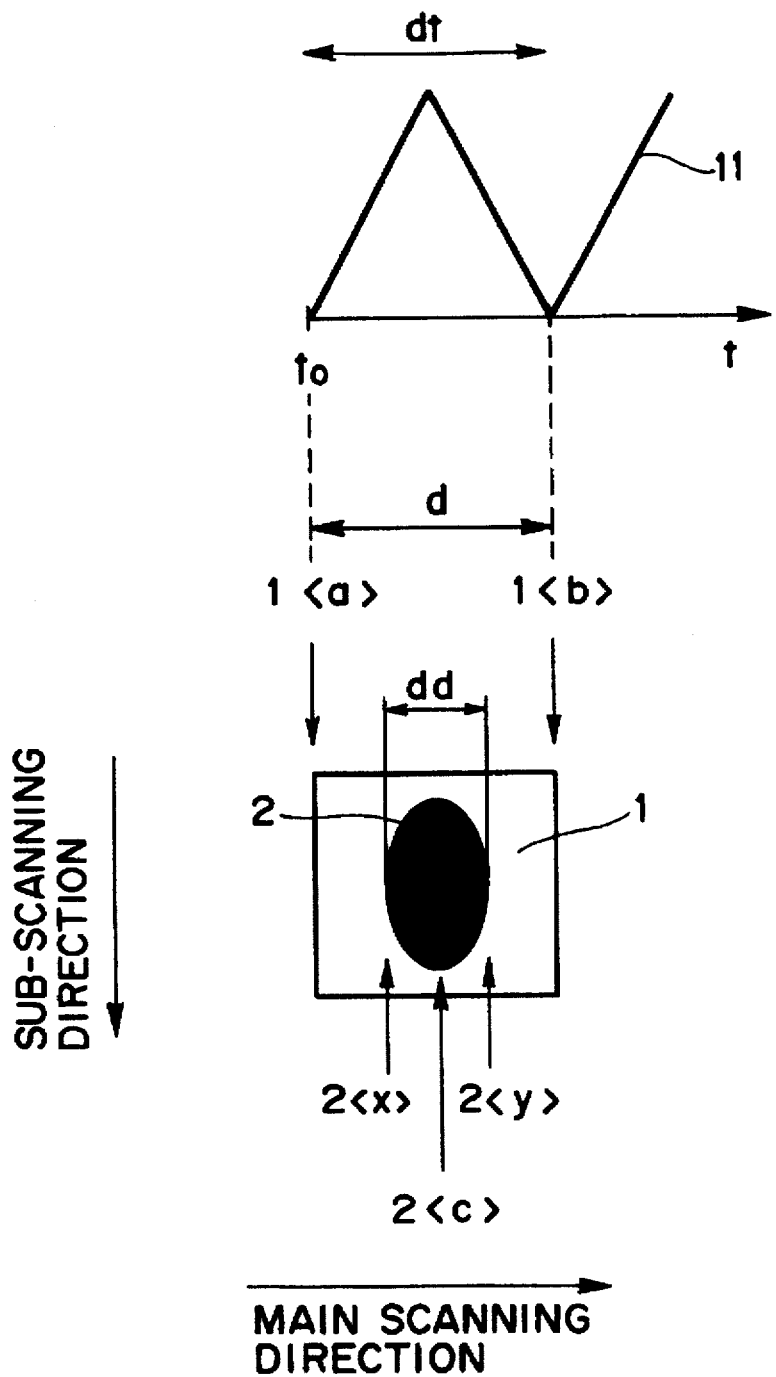
FIG. 9 shows the diagram for explaining the symbols used for explaining the control of waveform change of the chopped wave.

On remarkable feature of this embodiment, as shown in FIGS. 6–8, is to generate a plurality of chopped waves whose waveforms are different from each other so that the waveform of the chopped wave signal 11, a reference signal to form a dot in the pixel area 1, becomes asymmetrical to the pixel center in the sweeping duration (dt). All chopped waves are in synchronism with the start of the image signal representing the density of each pixel between the edges 1<$a$> and 1<$b$> of a recording pixel.

In this embodiment, a color laser beam printer capable of forming a full-color image is used, however, in the following description, the case where an image formation in two different colors is described in order to simplify the description.

When a dot is formed in the toner of a first color, the wave signal generator 409 generates a chopped wave 11a so that the apex P of the chopped wave is located at the time (¼)×dt, as shown in FIG. 6A. After the first-color-toner image is formed with the chopped wave 11a, the wave signal generator 409 generates a chopped wave 11b so that the apex P' of the chopped wave is located at the time (¾)×dt, as shown in FIG. 6B. Subsequently, the toner image of a second color is formed. FIG. 6C shows the waveforms where the chopped wave 11a is superimposed onto the chopped wave 11b. In this case, each apex (P, P') of the chopped waves 11a and 11b in the pixel area 1 appears every (½)×dt in the pixel string generated as continuation of each pixel in the main scanning direction.

As a result, the dot images shown in FIG. 7 are formed. As apparent from FIG. 7, the dot center of the first-color-toner image is apart d/2 from that of the second-color-toner image. Accordingly, by shifting the position of dot formation in each toner in advance, if the position is shifted owing to the limitation of the mechanical accuracy of a polygon mirror, the effect is reduced and a proper color tone can be reproduced. Particularly, when the dot width (dd) is narrow in the low density image, the dot interval approaches d/2 and the given dot internal (~d/2) becomes relatively large with respect to the shift of the small dot width. This characteristic is particularly effective to reproduce a proper color tone.

In a case where a density value of input image signal indicates a maximum value (if each color component is expressed in 8 bits, the density is represented by 0–255, and the maximum value is 255), the wave signal generator 409 generates a symmetrically shaped chopped wave so that the apex of the chopped wave will be located at the time (½)×dt in the pixel area 1 regardless of the color component. In other words, with respect to all color components, the pixel center of the image signal is coincident with the center of the beam spot (if the mechanical accuracy of the apparatus is considered, both centers are very close to each other). Accordingly, when dots are formed at the maximum density in each component, there is no chance for the resolution to be reduced, because the dot center 2<c> is situated in the same position in a pixel area (the position d/2 from the upper stream edge 1<a> in the main scanning direction). Furthermore, when this dot formation method is compared with the method to form a dot without mixing each color by shifting ½ pixel with respect to each toner which has been described earlier, color blur in the outline of a pixel caused by dot shift is small so that it can be ignored if the density change of the pixels next to each other is large or the dot width is wide. Accordingly, when the density value of the image signal is a maximum value, the tonality and resolution are balanced and an image having a high resolution can be obtained without shifting the position of dot formation in each toner. Furthermore, the control of chopped wave generation can apply not only to the maximum density value of the input image signal, but also to the image signal having a relatively high density value.

FIG. 8 shows the change of the waveform of a chopped wave in the case where the concept of synthesizing the images in the two-color-toners is applied to a four-color-toner image (a full-color image).

In this case, it can be controlled so that the dots formed by each color toner are separated from each other by generating a chopped wave from the wave signal generator 409 so that apexes ($P_1$, $P_2$, $P_3$, $P_4$) of the chopped waves 11c–11f corresponding to each toner are respectively located at (⅛)×dt, (⅜)×dt, (⅝)×dt, (⅞)×dt. Similarly, in the case of three colors of toners, the dots formed by each toner are separated at most by generating the chopped wave from the wave signal generator 409 so that the apexes of the chopped wave respectively come to the position where the time is (⅙)×dt, (½)×dt, and (⅚)×dt from the edge 1<a> of the pixel area 1. In this way, the concept described in this embodiment can be applied to multiple colors, and more particularly to three or more than three colors for a high quality image formation.

In the above description, the number of chopped waves, each of which has a different waveform, is equal to the number of toners used for image formation, or the number of chopped waves is larger than that number of chopped wave, taking a maximum density value into consideration. However, the number of chopped waves can be smaller than that of the number of toners, taking characteristics of an image to be formed and other factors into consideration.

According to the embodiment, in color image formation using a plurality of color toners, since the apex of the chopped wave of a chopped wave signal, a reference signal, used in PWM can be controlled so as to be located in a different position in each color toner in a pixel area in the main scanning direction, the center position of the beam spot formed based on the chopped wave and image signal separate from each other in each toner image. Accordingly, the positions of the formed dot are shifted from each other with respect to each toner color and are not overlapped to each other. Particularly, in a low density image, the image is formed so that the dots of each toner do not overlap each other and look independent from each other. Therefore, even though the dot formation position is shifted because of the limitation of the mechanical accuracy of the polygon mirror, a color tone can be reproduced properly and high reproducibility can be maintained. Furthermore, in image (dot) formation having a high density value, since the centers of each dot are overlapped or very close to each other, a resolution decline does not occur and a high-quality image can be attained.

In the above embodiment, an example such that the dot position is variable in the main scanning direction is described, however, it can be applied to the sub-scanning direction. That is, it is set such that the dot position in each line is variable in the sub-scanning direction, and the stripes occurred in the sub-scanning direction caused by the continuity of dots can be eliminated or a screen angle generated by dots is made variable.

<Second Embodiment>

In the first embodiment, chopped waves whose waveforms are different from each other are used as reference signals of PWM. However, in the second embodiment, the case where a waveform which is different from the chopped waves is used is described. Accordingly, in the second embodiment, it is assumed that the wave signal generator 409 generates a signal having the waveform described below.

Figure 10A:
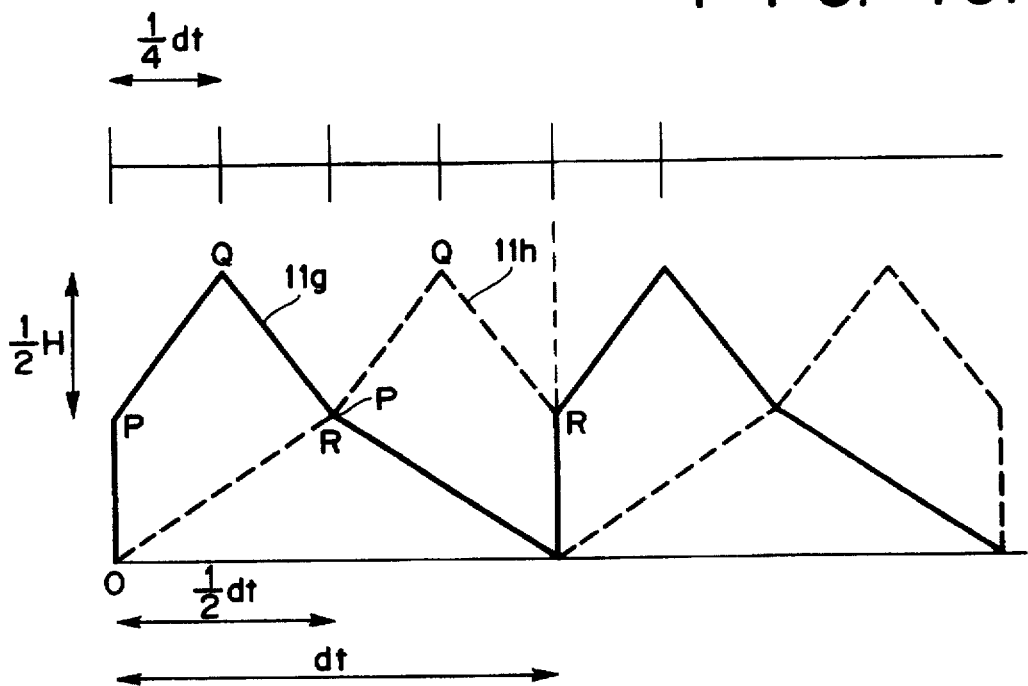
FIG. 10A and 10B are diagrams showing the waveform of a reference signal instead of the chopped wave used in PWM in accordance with a second embodiment.
Figure 10B:
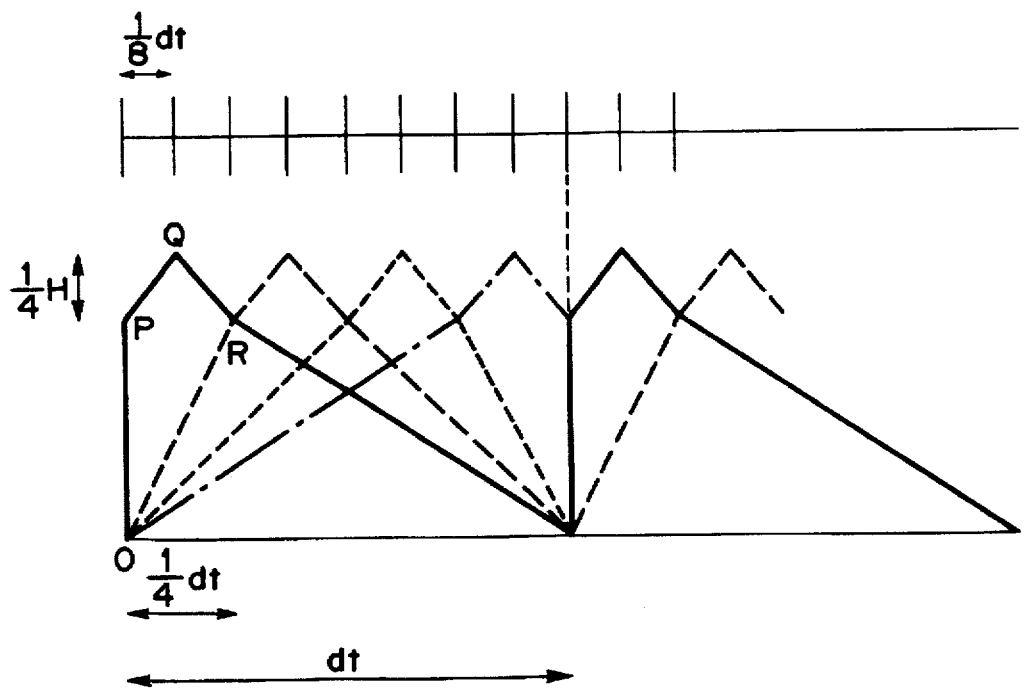

FIGS. 10A and 10B are diagrams illustrating the waveforms of reference signals instead of chopped waves used in PWM. FIG. 10A shows the case where two-color-toner image is formed, while FIG. 10B shows the case where four-color-toner image is formed. In the diagrams, "H" refers to a maximum amplitude value of the reference signal.

The points P, Q, and R refer to nodal points. In the waveform 11g of the reference signal, the nodal points P, Q, and R are the points that each point are respectively delayed 0, (¼)×dt, and (½)×dt from the point zero. On the other hand, in the waveform 11h of the reference signal, the nodal points P, Q, and R are the points that each point are respectively delayed (½)×dt, (¾)×dt, and dt from the point zero. The waveform 11h is generated so that the nodal point is delayed for dt/(the number of waveforms) with respect to the waveform 11g. The waveforms are sequentially formed. Furthermore, as shown in FIG. 10B, the waveform of the reference signal when the four-color-toner-image is formed is generated in a similar way and the nodal points P, Q, and R of each signal are generated so as to be delay for dt/(the number of waveforms) with respect to the waveform of the reference signal which is immediately before the current waveform.

A similar waveform can be applied to the case where three-color-toner image is formed. In this case, the nodal points P, Q, and R shown in FIGS. 10A and 10B are located at the positions 0, (⅙)×H, and (⅓)×H apart from the point zero in the time direction. On the other hand, the points are located at the positions (⅓)×H, 0, and (⅓)×H from the maximum amplitude value in the amplitude scale.

When the waveforms shown in FIGS. 10A and 10B are used instead of the chopped waves, if they are superimposed on the image signal 12, the dot formation is performed so that the interval of the dots formed by each toner becomes constant (maximum interval) until the density value represented by the image signal is between a minimum density value and the density value corresponding to the value indicated by the point P or R. The dot interval is ½ dt in FIG. 10A, while it is ¼ dt in FIG. 10B. On the other hand, the dot formation is performed so that the dot interval becomes gradually narrow when the density value varies from the density value corresponding to the points P and R, and the maximum density value.

According to the embodiment, the dot formation can be performed so that the dot interval becomes large when the image signal has a relatively small density value, while the dot interval becomes gradually small when the image signal has relatively large density value.

In the first and second embodiments, a color laser printer which performs image formation by repeating a process such that the toner of each color is developed and the toner image is transferred to a recording paper. However this does not impose a limitation upon the invention. For example, the invention can be applied to a color laser printer adopting a multi-developing one-shot-transfer electro-photographic method.

The image formation in such color laser printer can be performed as described below.

Figure 11:
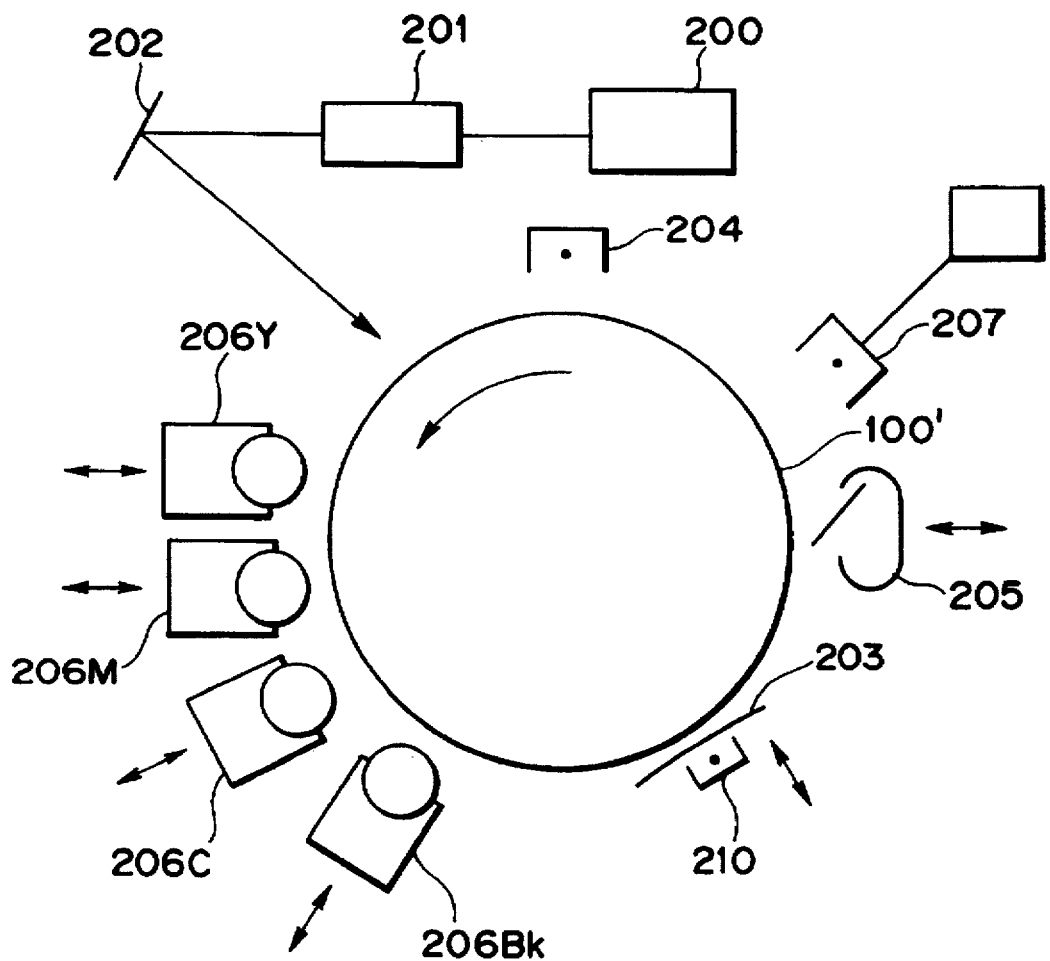
FIG. 11 is a sectional side view showing the construction of the color laser printer adopting a multi-developing one-shot-transfer electro-photographic process method.
Figure 14A:
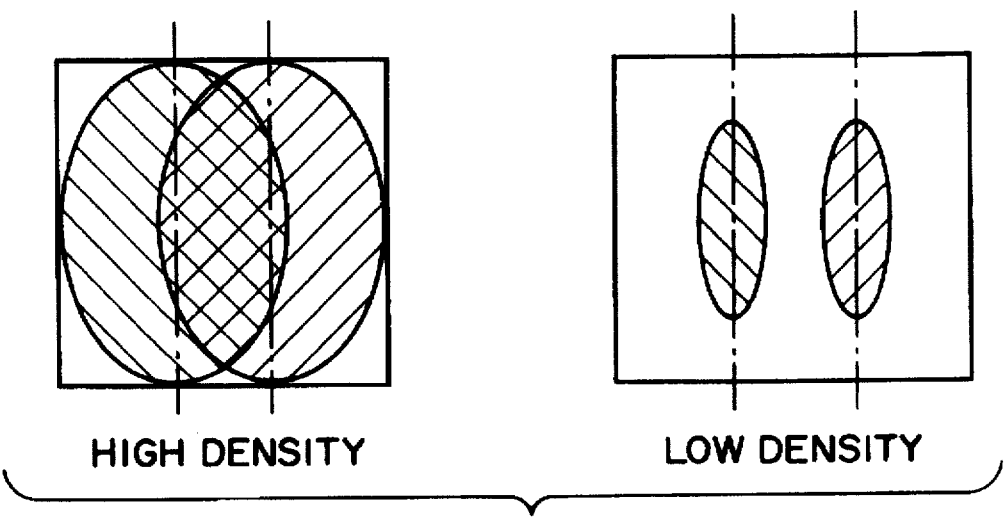
FIGS. 14A and 14B are diagrams for explaining the dot shift in accordance with an image density.
Figure 14B:
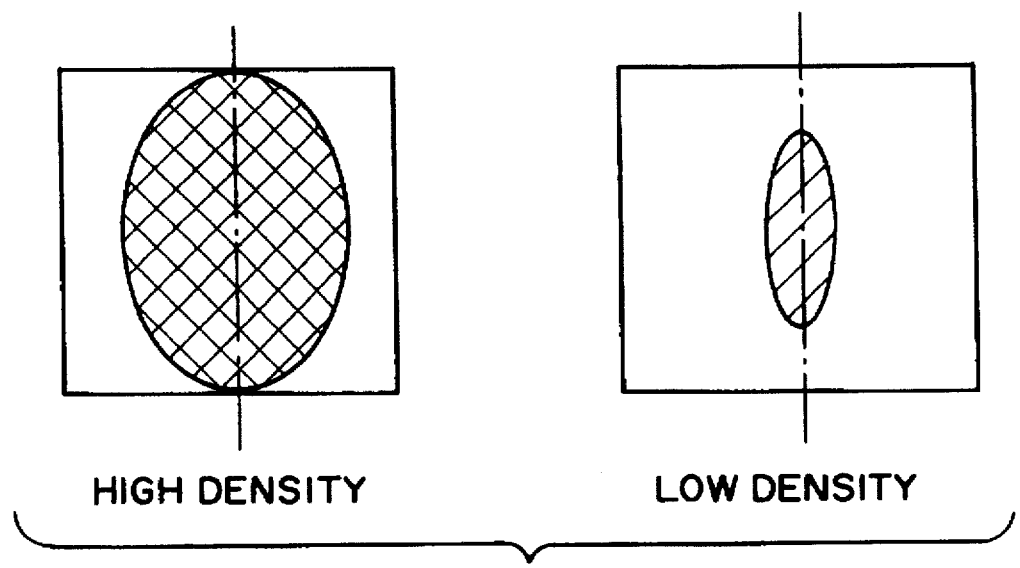

As shown in FIG. 11, the surface of the photosensitive drum 100' is electrified evenly by the electrostatic charger 204. A latent image is formed by scanning by the polygon mirror 201 and mirror 202 with the laser beam irradiated from the semiconductor laser 200, and only the portion where the laser beam is irradiated by reverse developing is developed. This process is repeated for the toners in three colors or four colors such as magenta, cyan, and yellow (and black), the toner images are superposed on another on the photosensitive drum 100', and a color image is formed. By the transfer electrostatic charger 210, this toner image is one-shot transferred to the recording paper which is adhered by the transfer drum 203. Subsequently, the toner remained on a photosensitive drum 100' is eliminated by the cleaner 205 and the remaining electric charge is removed by the electric discharger 207. Finally, the developed image is fixed by a fixing unit (not shown) and a color image is obtained. Furthermore, in FIG. 11, numerals 206Y, 206M, 206C, and 206BK are respectively a yellow (Y) developing unit, a magenta(m) developing unit, a cyan (C) developing unit, and a black (BK) developing unit.

In the multi-developing one-shot-transfer electro-photographic method, since the toners of multiple colors are simultaneously developed on the photosensitive drum 100', the toners of multiple colors will not be accumulated in the same position of the photosensitive drum where a latent image formation is performed in a case where a small dot is formed at the low density by changing the shape of the waveform of a reference signal in the PWM. Accordingly, the electrifying of the photosensitive drum and latent image formation are smoothly performed, and not only is the color tone properly reproduced, but also the image formation without color blur can be performed.

Still further, the present invention can be applied to a color laser beam printer adopting a multiple drum method as shown in FIG. 12.

The full-color laser beam printer as shown in FIG. 12 is comprised of the photosensitive drums 40Y, 40M, 40C, and 40BK which are respectively dedicated to each color component, the laser beam scanners 80YM 80M, 80C, and 80BK, the developing units 30Y, 30M, 30C, and 30BK, and the transfer dischargers 60Y, 60M, 60C, and 60BK, and the cleaners 70Y, 70M, 70C, and 70BK. The recording paper as a transfer material goes through the paper feeding guide 5a, and is sequentially transferred to the paper feeding roller 6, and paper feeding guide 5b. The recording paper is subject to corona discharge by the discharger 81 and is adhered to the transfer belt 9a. After that, the images formed on each photosensitive drum are transferred by the dischargers 60Y, 60M, 60C, and 60BK, discharged by the discharger 82 from the transfer belt 9a, and fixed by the fixing unit 17, and thus, a full-color image is obtained.

Particularly, in the laser beam printer with the arrangement shown in FIG. 12, a plurality of laser beam scanners and photosensitive drums are arranged in serial in the transferring direction of the recording paper for the purpose of high speed output of a full-color image. Therefore, in such an apparatus, a dot deviation is larger than the above-described laser beam printer from the limitation in the mechanical accuracy of each laser beam printer and photosensitive drum. Accordingly, as already described, proper color tone reproducibility becomes more effective by controlling to form the dots in each toner in a different position by changing the waveform of the reference signal in the PWM.

In a case where a center of a dot is shifted in accordance with a density value of mono color image data, the dot is alternately shifted forward or backward with respect to a main scanning direction. The shift amount in a relatively low density portion of an image is controlled in order for the shift amount to be very small so that a dot is not in contact with the neighboring dot. Thus, the formed latent image of the dots appears independent of each other. Furthermore, the electric field around the two adjacent dots becomes broader or larger, since the dots are closer to the preceding dot or subsequent dot with respect to a main scanning direction. As a result, high dot reproductivity in each pixel in a low density portion of an image can be attained.

In the above description, a color laser beam printer is used as an apparatus to which the invention is applied, however, this does not impose a limitation upon the invention. For example, the present invention is applicable to a digital copier having an image data input unit.

Still further, it is assumed that a PWM signal is generated by the hardware for the purpose of the high-speed operation. However, if the high-speed operation can be performed, the signal generation can be executed by a software performing the similar operation.

The present invention can be applied to a system constituted by a plurality of devices, or to an apparatus comprising a single device. Furthermore, it goes without saying that the invention is applicable also to a case where the object of the invention is attained by supplying a program to a system or apparatus.

As many apparently widely different embodiments of the present invention can be made without departing from the spirit and scope thereof, it is to be understood that the invention is not limited to the specific embodiments thereof except as defined in the appended claims.

What is claimed is:

1. A color image forming apparatus which modulates a light beam in accordance with a density value of each pixel represented by a color image signal and forms an image corresponding to the density value by irradiating the modulated light beam onto photoreceptive means, comprising:

input means for inputting the color image signal composed of a plurality of color component signals;

modulation means for modulating the light beam based on the color image signal;

irradiating means for irradiating the modulated light beam onto the photoreceptive means; and formation means for forming a dot corresponding to a beam spot formed by irradiation of the modulated light beam, wherein said modulation means comprises control means for controlling a center position of the dot formed by said formation means in accordance with a color component and the density value of the color component signals.

2. The apparatus according to claim 1, wherein said control means controls a shift amount of the center position of the dot so as to be relatively large in a case where the density value is small, and so as to be relatively small in a case where the density value is large.

3. The apparatus according to claim 1, wherein said modulation means employs Pulse-Width Modulation, and said control means comprises control signal generation means for generating a control signal to determine an irradiation start time for starting irradiation of the light beam and a duration of the irradiation for the Pulse-Width Modulation based on the density value of each pixel represented by the color image signal.

4. The apparatus according to claim 1, wherein said modulation means employs Pulse-Width Modulation, and further comprises control signal generation means for generating a control signal to determine an irradiation start time for starting irradiation of the light beam and a duration of the irradiation for the Pulse-Width Modulation based on the density value of each pixel represented by the color image signal, wherein said control signal generation means generates a plurality of different control signals whose number is equal to or less than the number of the color components, and each of the control signals is a chopped wave signal having a period corresponding to each pixel of the color image signal, and the waveform of each chopped wave signal is different from that of the other chopped wave signals and its shape is asymmetrical to the center of each pixel.

5. The apparatus according to claim 4, wherein for each chopped wave signal generated by said control signal generation means, the period of the chopped wave signal is dt, a respective starting point of each pixel of the color image signal is zero, and the time corresponding to the apex of the waveform of the chopped wave signal is approximately expressed by:

$$dt \times (2n-1)/(2N)$$

wherein ($n=1, \ldots, N$), ($2 \leq N \leq M$), and M is the number of the color components.

6. The apparatus according to claim 4, wherein each control signal generated by said control signal generation means is a signal having a cycle corresponding to each pixel of the color image signal, and the waveform of the control signal is asymmetrical to the center of each pixel and has an inflection point when the signal is changed from the minimum amplitude to the maximum amplitude or from the maximum amplitude to the minimum amplitude.

7. The apparatus according to claim 3, wherein the control signal generated by said control signal generation means is a chopped wave signal having a period corresponding to each pixel of the color image signal, and the waveform of the chopped wave signal is asymmetrical to the center of each pixel.

8. The apparatus according to claim 3, wherein the control signal generated by said control signal generation means is a signal having a cycle corresponding to each pixel of the color image signal, and the waveform of the signal is asymmetrical to the center of each pixel and has an inflection point when the signal is changed from the minimum amplitude to the maximum amplitude or from the maximum amplitude to the minimum amplitude.

9. The apparatus according to claim 2, wherein said control means controls a maximum shift amount to be a dot width formed by the beam spot corresponding to a maximum density value.

10. The apparatus according to claim 2, wherein said control means controls the shift amount to be zero in a case where the density value is a maximum value.

11. A color image forming method which modulates a light beam in accordance with a density value of each pixel represented by a color image signal and forms an image corresponding to the density value by irradiating the modulated light beam onto photoreceptive means, comprising:

an input step for inputting the color image signal composed of a plurality of color component signals;

a modulation step for modulating the light beam based on the color image signal;

an irradiating step for irradiating the modulated light beam onto the photoreceptive means;

a formation step for forming a dot corresponding to a beam spot formed by irradiation of the modulated light beam; and a control step for shifting the center position of the dot formed by said formation step in accordance with a color component and the density value of the color component signals.

12. The method according to claim 11, wherein said control step controls a shift amount of the center position of the dot so as to be relatively large in a case where the density value is small, and so as to be relatively small in a case where the density value is large.

13. An image processing apparatus comprising:

input means for inputting a color image signal composed of a plurality of color component signals; and generation means for generating first and second pulse width modulated signals, based on first and second pattern signals and the color image signal inputted by said input means, and for selectively outputting a generated pulse width modulated signal in accordance with a color component, wherein a period of the first pattern signal is the same as that of the second pattern signal, and the waveforms of the first and second pattern signals are different from each other.

14. The apparatus according to claim 13, wherein said generation means selectively outputs either the first or second pulse width modulation signal in accordance with the density value of the color image signal.

15. The apparatus according to claim 14, further comprising image forming means for forming an image based on the signal selectively outputted by said generation means.

16. An image processing apparatus comprising:

input means for inputting a color image signal composed of a plurality of color component signals; and generation means for generating first and second pulse width modulated signals, based on first or second pattern signals and the color image signal inputted by said input means, and for selectively outputting a generated pulse width modulated signal in accordance with the density value of the color component signals, wherein a period of the first pattern signal is the same as that of the second pattern signal, and the waveforms of the first and second pattern signals are different from each other.

17. The apparatus according to claim 16, further comprising image forming means for forming an image based on the signal selectively outputted by said generation means.

* * * * *

UNITED STATES PATENT AND TRADEMARK OFFICE
CERTIFICATE OF CORRECTION

PATENT NO. : 5,724,090

DATED : March 3, 1998

INVENTOR(S) : MAMORU TANAKA, ET AL.

It is certified that error appears in the above-identified patent and that said Letters Patent is hereby corrected as shown below:

COLUMN 3

Line 41, "FIG. 10A" should read --FIGS. 10A--.

COLUMN 4

Line 48, "lead" should read --led--.

COLUMN 5

Line 25, "photo sensitive" should read --photosensitive--;
  Line 27, "electoro-" should read --electro- --;
  Line 36, "chapped" should read --chopped--;
  Line 62, "$C_{,2}, C_{,3},$" should read --$C_2, C_3,$--; and
  Line 66, "another," should read --one another,--.

COLUMN 6

Line 9, "position of the dot" should read
      --positions of the dots--;
  Line 15, "other" should read --another--;
  Line 19, "The human" should read --Human--; and
  Line 59, "On" should read --One--.

COLUMN 7

Line 28, "internal" should read --interval--.

UNITED STATES PATENT AND TRADEMARK OFFICE
CERTIFICATE OF CORRECTION

PATENT NO. : 5,724,090

DATED : March 3, 1998

INVENTOR(S) : MAMORU TANAKA, ET AL.

It is certified that error appears in the above-identified patent and that said Letters Patent is hereby corrected as shown below:

COLUMN 8

Line 4, "(7/8) x dt." should read --and (7/8) x dt.--;
Line 8, "wave" should read --waves--; and
Line 18, "wave," should read --waves,--.

COLUMN 9

Line 14, "delay" should read --delayed--;
Line 41, "relatively" should read --a relatively--;
Line 45, "However" should read --However,--;
Line 61, "another" should read --one another--;
Line 65, "remained" should read --remaining--; and
Line 66, "a" should read --the--.

COLUMN 10

Line 5, "magenta (m)" should read --magenta (M)--;
Line 24, "40BK" should read --40BK,--;
Line 25, "80YM" should read --80Y,--;
Line 31, "subject" should read --subjected--; and
Line 42, "high speed" should read --high-speed--.

UNITED STATES PATENT AND TRADEMARK OFFICE
CERTIFICATE OF CORRECTION

PATENT NO. : 5,724,090

DATED : March 3, 1998

INVENTOR(S) : MAMORU TANAKA, ET AL.

It is certified that error appears in the above-identified patent and that said Letters Patent is hereby corrected as shown below:

<u>COLUMN 11</u>

Line 5, "can" should read --cannot--.

Signed and Sealed this

Eighth Day of September, 1998

*Attest:*

BRUCE LEHMAN

*Attesting Officer*    *Commissioner of Patents and Trademarks*